April 20, 1965 N. R. CASTELLINI 3,179,939
SYSTEM FOR DETERMINING COLLISION COURSES
Filed April 9, 1963 3 Sheets-Sheet 1

$\theta_K = \tan^{-1} \frac{xy\, to}{1-y\, to}$ $X = \tan \mathcal{f}_{K_0} = 0.1$ $Y = \frac{V_r}{R_0}$ to = 10 sec.

INVENTOR
Nello R. Castellini

BY Moore, Hall & Pocock

ATTORNEYS

April 20, 1965 N. R. CASTELLINI 3,179,939
SYSTEM FOR DETERMINING COLLISION COURSES
Filed April 9, 1963 3 Sheets-Sheet 2

INVENTOR
Nello R. Castellini

BY

ATTORNEYS

April 20, 1965 N. R. CASTELLINI 3,179,939
SYSTEM FOR DETERMINING COLLISION COURSES
Filed April 9, 1963 3 Sheets-Sheet 3

INVENTOR
Nello R. Castellini
BY
ATTORNEYS

3,179,939
SYSTEM FOR DETERMINING COLLISION COURSES
Nello R. Castellini, 42 Bruce Road, Red Bank, N.J.
Filed Apr. 9, 1963, Ser. No. 271,699
17 Claims. (Cl. 343—112)

This application comprises a continuation-in-part of my prior copending application Serial No. 784,951, filed January 5, 1959, for "Method and Apparatus for Determining Collision Courses," now U.S. Patent No. 3,095,560, issued June 25, 1963.

The present invention relates to an improved method and apparatus, adapted to be employed in conjunction with moving vehicles, to determine when two or more such vehicles are on a collision course.

In a preferred embodiment of the invention, the method and apparatus is employed for collision prevention. However, as will become apparent from the subsequent description, the basic principles involved in such collision prevention find equal application in collision guidance, wherein a collision is intentionally desired, i.e., in guiding a vehicle or missile toward another vehicle or missile. Moreover, as will also become apparent, the principles of the present invention may further be employed in aircraft or vehicle guidance, e.g., in a GCA aircraft landing system. It must therefore be understood that these guidance concepts are contemplated in the subsequent description and appended claims whenever the phrase "collision prevention" is employed.

Collision prevention systems are of considerable interest in relation to ground, sea, and air traffic; and are particularly desired to inform, warn, and, if necessary, automatically assume control from, an operator of a vehicle, when said vehicle is determined to be on a collision course with another object which may be either moving or stationary. In general, a true collision prevention system must be able to predict and inform an operator or a navigation computer that the vehicle trajectory intersects the trajectory of another vehicle; and it must be able to perform these functions over a relatively large solid angle in which intersecting trajectories or collision courses may exist.

Various systems have been proposed in the past for giving collision warning information, or for effecting guidance of a moving vehicle when it is on a collision course. In general, however, systems proposed heretofore have taken the form of warning devices and proximity indicators which, by their very nature, provide insufficient information to avoid collision under certain circumstances; and various systems suggested heretofore which purport to prevent collision have in general been so arranged that they may effect this function only in a particular direction (e.g., when the moving vehicle is on a "head on" collision course); or, in the alternative, seek to avoid collision under more general conditions with incomplete information, wherefore, collision avoidance may be expected to fail in some circumstances. Collision prevention systems suggested heretofore have, moreover, recognized the obvious fact that, for two vehicles to collide, they must approach one another, and must do so in such a way that somewhere along their trajectories, they come into physical contact with one another. Prior systems have thus sought to determine at all times precisely where two objects are relative to one another. In practice, such a point-to-measurement approach has necessarily required extreme refinements of measurement, indeed, refinements which were, in many cases, substantially unobtainable by existing equipments.

In my prior Patent No. 3,095,560 the deficiencies of prior systems, as described above, were avoided in large part by a novel method of collision prevention based upon a unique application of the kinematics of collision. The system of my said prior copending application utilized what may be termed a "statistical" approach, in that it did not concern itself with a physical determination and measurement of the relative position of two bodies in space. The essential determination involved an analysis of whether two bodies are tending to approach one another so as ultimately to fall within a minimum separation distance K. Thus, in my said prior patent (as well as in the system of the present application), the collision prevention apparatus does not concern itself with the possibility of physical collision between two objects, but is concerned with avoiding the entry of these two objects into a spherical volume in space, the diameter of which spherical volume can be made sufficiently large (but still sufficiently small) to permit realistic collision avoidance by available equipments. This approach, by emphasizing a minimum distance K, i.e., by determining collision criteria in relation to a collision sphere, thus accepts limitations in existing sensing and measuring equipments, and unavoidable random fluctuations which may also occur; and then defines, in terms of these accepted limitations, a collision course that involves a distance of closest approach K. The distance K could thus be termed a "packing factor" since it sets a limit as to how close the vehicles can come to one another; and the system is accordingly concerned with keeping the vehicles out of this volume, rather than keeping the vehicles out of physical contact with one another.

In my said prior patent, identified above, the criteria for collision were formulated in terms of the kinematics of motion. In order to determine whether two vehicles, moving relative to one another, were approaching one another in such manner as to tend to fall within a predetermined minimum distance desired between said vehicles, means were provided for monitoring the line-of-sight between said vehicles as their relative motion progressed. It was then shown that, in order for a collision to occur, two conditions must be satisfied simultaneously, as follows:

(a) the radial velocity along said line-of-sight must be negative; and (b) the angle between said line-of-sight and the relative trajectory of the interfering vehicle (i.e., its trajectory referred to the protected vehicle considered as fixed) must be less than the angle subtended by the radius of the collision sphere at the distance in question, (the collision sphere being defined as a function of the physical dimensions of the vehicles, and of safety factors imposed by the necessarily statistical nature of the measurements).

The measurements to establish the presence or absence of the conditions, it was further shown, could conveniently be performed with a Doppler radar system, by determining the Doppler velocity, its sense, and either its rate of change or (since it is a function of this rate), the rotation of the line-of-sight.

Some methods and apparatuses for effecting collision avoidance in accordance with the foregoing criteria were described in my earlier Patent No. 3,095,560, identified above; and the systems to be described hereinafter are based on many of the same concepts. Thus, in both systems, the observed variables are distance, azimuth, Doppler and certain derived collision variables, i.e., the distance or strength of the signal, the Doppler sense, the magnitude of the Doppler and the rotation of the line-of-sight. The instant application, however, contemplates the provision of a system wherein these variables are manipulated in a novel manner, thereby to attain a higher traffic capacity, and higher operational effectiveness, utilizing more simplified equipment.

By way of example, in my earlier system, information signals were essentially manipulated in a single step, or at only one point in an information channel, so that the essential factor serving to control the admission of a signal to final observation became the strength of that signal. This requires a storage and signal processing capacity which is directly proportional to traffic volume; and in practice, this may be quite large. In the improved system of the present invention, however, the variables are manipulated in a series of steps, utilizing the variables (1) signal strength, (2) Doppler sense, (3) a signal proportional to the rate of closure obtained by taking the product of signal and the Doppler amplitude, and (4) the rotation of the line-of-sight. As a result, in the arrangement to be described hereinafter, the storage and processing capacity become substantially independent of traffic volume. In fact, as will appear hereinafter, with only the storage capacity afforded by three narrow tracks of a magnetic drum storage device and relatively simple circuits, the system can easily handle a very large number of targets. The number being handled is primarily controlled by the antenna beam width and scanning period; and, as will appear hereinafter, for a beam of 2°, scanning at the rate of 2 per second, as many as 180 approaching targets can be handled per second by the system. This represents a significant increase in the traffic capacity and operational effectiveness of the system.

In the system of my prior Patent No. 3,095,560, moreover, the collision prevention assumed that the diameter of the collision sphere remained constant during system operation; and various signals were derived and manipulated on the basis of this assumption. In the present invention, however, the signals are so manipulated that the observation interval, rather than the diameter of the collision sphere, is kept constant. The effect of this is to improve the operational effectiveness of the system since, by keeping the observation interval constant, the system effectively adjusts the diameter of the collision sphere as a function of the seriousness of the collision threat; and the more serious the threat, the smaller the diameter provided.

A higher overload capacity is also insured in the present system by a better definition of the collision volume. In my earlier system, this volume was defined as a hemisphere forward of the vehicle. However, in the arrangement of the present invention, desired protection is achieved by monitoring collision criteria in a hemispherical segment of about 10° elevation located forward of the vehicle.

It is accordingly an object of the present invention to provide an improved apparatus for determining when two or more objects, moving relative to one another, are on a collision course with respect to one another.

Another object of the present invention resides in the provision of improved systems, based upon a novel interpretation of the kinematics of collision, and adapted to prevent (or produce) collision between relatively moving objects.

A still further object of the present invention resides in the provision of an improved collision prevention apparatus which takes into account relative radial velocity, relative tangential velocity, miss distance, and apparent "time-to-go" in determining when two or more relatively moving objects are on collision course.

A still further object of the present invention resides in the provision of improved collision prevention systems adapted to effect surveillance of a collision volume disposed adjacent an observer object, and adapted further to determine and concentrate upon objects within said volume which are on collision courses with said observer object, while ignoring other objects within said volume which are not on collision courses.

Still another object of the present invention resides in the provision of an improved apparatus which is adapted to determine whether or not relatively moving vehicles are on collision courses with respect to one another by proper treatment of a measured line-of-sight, and changes therein, between a pair of vehicles.

A still further object of the present invention resides in the provision of improved collision avoidance systems which are adapted to exhibit more reliable operation than has been possible heretofore.

Still another object of the present invention resides in the provision of improved collision prevention systems which have higher traffic capacity, higher operational effectiveness, and which utilize more simple equipment than has been the case heretofore.

Another object of the present invention resides in the provision of a collision avoidance system based upon the concept of a collision sphere, and so arranged that the diameter of said collision sphere is automatically adjusted as a function of the seriousness of a collision threat.

A further object of the present invention resides in the provision of an improved collision avoidance system so arranged that the storage and processing capacity thereof is essentially independent of traffic volume, whereby a large number of targets can be conveniently handled with a relatively small storage mechanism and with relatively simple circuits.

In providing for the foregoing objects and advantages, the present invention contemplates the utilization of a method of collision avoidance which is essentially similar to that described in my prior patent No. 3,095,560; and the disclosure of that prior patent is accordingly incorporated herein by reference. In essence, the line-of-sight between two possible interfering vehicles is monitored by proper treatment of relative radial and tangential velocities between two relatively moving vehicles which may be on a collision course relative to one another. This monitoring can be achieved in either a "cooperative" or a "non-cooperative" system, both of which will be described hereinafter. The cooperative system is so termed since each vehicle provides an energy source to make itself visible. As will be described hereinafter, the cooperative system is essentially a CW system based on the measurement of Doppler velocity and of the rotation of the line-of-sight, and on the estimation of the approximate distance between the vehicles by the strength of the received signal. Only vehicles having velocities of approach are accepted for observation, the others being automatically rejected. The output of the system is obtained through specific logic circuitry, and appears on a visual indicator which displays the present approximate distances and the present azimuths of the vehicles with reference to the respective azimuths existing at the time at which the measurements were first initiated. The display of those vehicles which are on a collision course, is intensified for emphasis and to direct the attention of the operator.

The non-cooperative system of the present invention is, essentially, a radar capable of MTI performance in which the components following the IF amplifier are chosen to measure simultaneously and automatically the Doppler frequency and the range. The result of these measurements is handled in the same way as in the cooperative system.

In design performance, both systems are capable of avoiding collision with high reliability under conditions of heavy traffic density; the radius of the collision sphere is about 2.5% to 5% of the distance between the vehicles at the time of start of the measurement. The duration of the measurement is the same for all vehicles, but the instant at which it is initiated is chosen as a function of the closing speed, so that fast approaching vehicles are kept farther apart than those approaching more slowly.

In both the cooperative and non-cooperative systems of the present invention, the system operates to avoid collision, very much in the same way that collisions are avoided visually every day. When driving a car, for instance, one observes all vehicles within a certain volume of space, which volume is instinctively or otherwise judged to be the volume within which potential threats reside.

Vehicles that are moving away are immediately dismissed, and attention is focussed only on those approaching. These vehicles are not examined critically all at the same time, i.e., those moving slowly are examined at shorter distances than those moving fast; that is, it is as if a constant "time-to-go" criterium were employed in assigning the priority for admission to closer examination. Once admitted to examination, the mechanism by which the existence of a collision course is established may be quite complex, but the estimation of the rate of rotation of the line-of-sight seems to play a predominant role in it. At any rate, the result is that if this rate is large, the vehicle is immediately dismissed as a collision threat, while if small, the observation is continued, apparently to obtain a better estimate, until finally the decision is made to remain on course or maneuver out of it.

The systems to be described hereinafter closely duplicate every step in the above process. The system keeps under constant observation a volume of space which roughly is in the shape of a spherical wedge of about 10 to 20 miles radius fanning in azimuth 180 degrees and opening above the flight plane about 10 degrees. This volume, it can be shown, retains all possible collision threats of practical importance. The system determines the relative radial velocity of all vehicles within this space by measuring the Doppler frequency; and vehicles that are moving away are immediately dismissed. For vehicles that are approaching, the product of the relative radial speed and of the reciprocal of the range is obtained (i.e., the reciprocal of the apparent "time-to-go" or time of closure). If this product exceeds a preassigned constant, the azimuth of the vehicle is stored as reference; but, if not, nothing happens. On successive observation periods (scanning period of the antenna), if the same conditions are met (if not met, the system starts anew), the new azimuth is compared with the reference azimuth; and if the difference between them is less than a preassigned amount, the two azimuths are displayed as a pulse doublet in which the separation of the pulses is a function of the difference in azimuth. The display is made at a low value of intensity until the end of the observation interval (i.e., about 10 seconds) when, if the above condition still persists, the doublet is displayed at maximum intensity. The members of the doublet are of different amplitude so that one can tell whether contact with the collision sphere (an imaginary sphere of appropriate dimensions that surround every vehicle) will occur fore or aft of the protected vehicle.

It is clear from these remarks that the system admits to examination only potential threats and that they are admitted on the apparent "time-to-go" criterium, so that those with a fast rate of closure are admitted at a greater distance than those whose rate is small. Of these threats, only those that are dangerous (by intercepting the collision sphere) are emphasized to the pilot and brought to his attention with information to enable him to decide on the best evasive maneuver.

The foregoing objects, advantages, construction and operation of the present invention will become more readily apparent from the following description and accompanying drawings, in which.

In my prior Patent No. 3,095,560 (see particularly the description of FIGURES 1A and 1B therein), it was shown that, for two possible interfering vehicles designated O and I, respectively, the mathematical formulation of the radial velocity and angular considerations referred to a line-of-sight between said vehicles [i.e., the (a) and (b) conditions described above] are respectively:

$$\vec{V}_r < 0 \quad (1)$$

and $$\sin \zeta = \frac{V_t}{V} \leq \frac{K}{R} \quad (2)$$

where:

$\vec{V}_r$ = radial component of relative velocity, i.e., $$\vec{V} = \vec{V}_I - \vec{V}_O = \vec{V}_r + \vec{V}_t$$

$\vec{V}$ = relative velocity of the I-vehicle with reference to the O-vehicle, $\vec{V}_t$ = tangential component of $\vec{V}$, $R$ = distance between the vehicles, $K$ = radius of the collision sphere, $\zeta$ = angle between $\vec{R}$ and $\vec{V}$.

Figure 1:
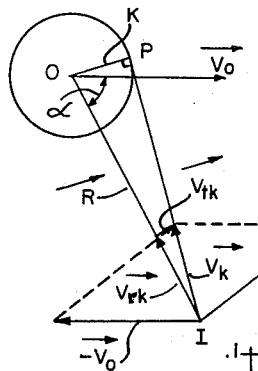
FIGURES 1 and 2 are vector diagrams illustrating the kinematics of collision, and the various factors thereof, which are employed in the present invention.

Equations 1 and 2 thus represent the collision conditions, discussed above; and the geometrical and kinematical relationships between the quantities, represented by the foregoing symbols, are shown in FIGURE 1. FIGURE 1 is drawn for the special case in which the relative trajectory IP of the interfering vehicle at I is such that it is just tangent to the K-sphere at P, and the vehicles are approaching. Since this special case has been assumed in FIGURE 1 (and in FIGURE 2), the various symbols have been given a $k$ superscript in the figures.

Figure 2:
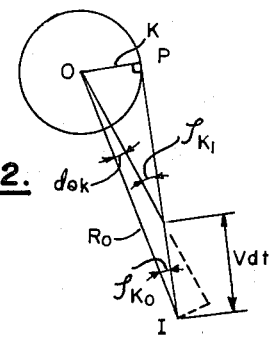

As the vehicle at I moves towards O, the line-of-sight between said vehicles rotates. In time $dt$ it rotates the differential amount $d\theta_k$ as shown in FIGURE 2. From this figure it can be seen that $$d\theta_k = KV/R^2 \, dt \quad (3)$$

Expressing R in Equation 3 in terms of $R_o$, K, V, and time $t$, and integrating, the rotation $\theta_k$ in a time interval $t_o$ is found to be $$\theta_k = \tan^{-1} \frac{KV_k t_o}{R_o^2 \left(1 - \frac{V_k}{R_o} \cos \zeta_{ko} t_o\right)} \quad (4)$$

which, on expressing $V_k$ in terms of $V_{rk}$ and $\zeta_{ko}$, takes the form $$\theta_k = \tan^{-1} \frac{\frac{K}{R_o} \frac{V_{rk}}{R_o} t_o}{\cos \zeta_{ko} \left(1 - \frac{V_{rk}}{R_o} t_o\right)} \quad (5)$$

where:

$R_o$ is the distance between vehicles at which the measurement is initiated.

Suppose, now, that the relative course of the vehicle at I is other than that along IP; and, more specifically, suppose that the course makes an angle $\zeta$ with $R_o$ and that the distance of closest approach is $x$ where $$x \lessgtr K$$

Proceeding as before, it is found that the rotation $\theta_x$ is, in this case $$\theta_x = \tan^{-1} \frac{\frac{x}{R_o} \frac{V_{rx}}{R_o} t_o}{\cos \zeta \left(1 - \frac{V_{rx}}{R_o} t_o\right)} \quad (6)$$

Since, $$\frac{x}{R_o \cos \zeta} = \tan \zeta$$

which approaches zero as $x$ approaches zero, it is seen by comparing Equations 5 and 6 that $\theta_x$ is less than, equal to, or greater than $\theta_k$ depending on whether $x<K$, $x=K$, or $x>K$, respectively. Accordingly, the second collision condition referred to above can be written $$\theta_x \leq \theta_k \quad (7)$$

Since $\theta_k$ can be computed from Equation 5 for any chosen values of the parameters, if $\theta_x$ can be measured, it will be possible by comparison to decide whether or not the possibility of a collision exists.

It is clearly desirable that there be only one value of $\theta_k$ against which to compare actual measurements. Equation 5, however, indicates that there is a multitude of values of $\theta_k$ dependent upon K, on the distance $R_o$ at which the measurement is initiated, on the time of measurement $t_o$, and on the radial velocity $V_{rk}$ of the vehicle. There is some latitude in choosing K, $R_o$ and $t_o$, but not $V_{rk}$. Therefore, since it is certainly also desirable to make $t_o$ constant, the only way to achieve a constant $\theta_k$ is to make $$\frac{K}{R_o \cos \zeta_{ko}} \cdot \frac{V_{rk}}{R_o} = \tan \zeta_{ko} \frac{V_{rk}}{R_o} = \text{constant} \quad (8)$$

which shows $\theta_k$ will be a constant if $\zeta_{ko}$ is kept fixed as $R_o$ varies and if $R_o$ is chosen proportional to $V_{rk}$.

Keeping $\zeta_{ko}$ fixed implies allowing K to vary proportionately with $R_o$ if $\zeta_{ko}$ is small; that is, to let the radius of the collision sphere vary so that it is small at short ranges, larger at longer ranges. On the other hand, choosing $R_o$ proportional to $V_{rk}$ means initiating the measurements only if the product of some quantity proportional to $V_{rk}$, multiplied by some quantity that is inversely proportional to $R_o$, equals a preassigned constant. Specifically, if $A_V$ is the magnitude of the first quantity and $A_R$ that of the second, the measurement is initiated if $$A_V A_R \geq M, \text{ a constant} \quad (9)$$

There is considerable merit in this approach since, although K and the distance at which the measurement is initiated now vary, they vary in such a way that a larger separation and an earlier maneuver is insured at the larger speeds when they are clearly desirable.

Figure 3:
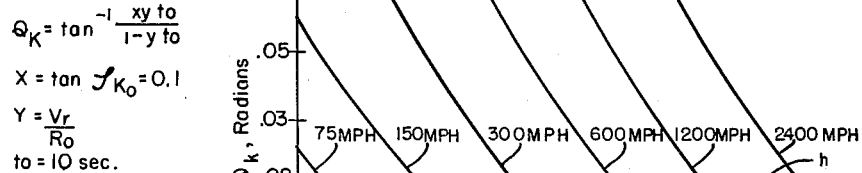
FIGURE 3 is a graphical plot illustrating certain aspects of the operation of the system of the present invention.

A more concrete appreciation of the approach proposed can be obtained with the aid of FIGURE 3. This figure is a plot $\theta_k$ in Equation 5 against $R_o$ for tan $\zeta_{ko}=0.1$ and $t_o=10$ sec., with $V_{rk}$ as a parameter (i.e., the several curves in FIGURE 3 are plotted for different assumed radial velocities between the vehicles). Fixing tan $\zeta_{ko}$ at such a small value insures that K is essentially proportional to $R_o$. If, in FIGURE 3, a horizontal line is drawn at any chosen value of $\theta_k$, as indicated for example at $h$, the abscissa of the intersections of this line with the curves gives the distances $R_o$ at which the measurement for the specific speeds must be initiated. As is thus indicated on FIGURE 3, the greater the relative velocity between the vehicles, the greater the distance at which the measurement is commenced to permit observation for a constant time interval. In effect, the diameter of the collision sphere is adjusted as a function of the relative radial velocity between possible interfering vehicles.

The threat must fall within the observer's field of view if it is to be avoided, hence, the coverage that the antenna or antennae of each system must provide includes all possible positions of the relative velocity vector. In my prior Patent No. 3,095,560, the types of antennae which could be employed on the vehicles, and the coverage to be afforded thereby, were discussed and analyzed (in reference to FIGURE 3 thereof); and this discussion is incorporated herein by reference.

Since the aircrafts (or other vehicles) may have motions in any direction, it may be thought that the field of view required should encompass the complete sphere about each observer. This would indeed be so if each observer's system were required to provide complete coverage irrespective of whether the magnitude of its speed is greater than, equal to, or less than that of other vehicles considered as intruders $$\left(\text{i.e., } V_O \gtreqless V_I\right)$$

The relationship of observer and intruder, however is reciprocal; and, from this, it follows that each system need only provide the coverage for the case in which its speed is equal to or greater than that of others. Under these conditions, the coverage is only $\pi$ radians in the flight plane and $\pi$ radians in the plane vertical to it, that is, the field of view is $2\pi$ steradians forward of the vehicle. This result can be established by the method used in my aforementioned prior patent, or more directly, by considering the locus of the relative velocity vector $\vec{V}$ for all possible directions of the velocity $\vec{V_I}$.

In arriving at the result above, it has been tacitly assumed that intruding vehicles may have components of velocity, in the horizontal and vertical planes, of any value between zero and $V_{I \max}$, the maximum design speed of the intruding aircraft or vehicle. In practice, this is not so, because the vertical component is limited to only a small fraction of $V_{I \max}$ by considerations that are not of concern here; for instance, faster aircrafts have vertical rates of climb and descent of about 1000 and 1500 feet per minute, and slower crafts have correspondingly smaller rates.

Taking this limitation into consideration, it is found that the coverage in the flight plane remains at $\pi$ radians, but that in the vertical plane, the coverage may be radically restricted. Specifically, it is found that a coverage of 10 degrees in the vertical plane should be adequate, because it can be shown that, although theoretically about 0.02 percent of the possible courses are then not seen, these courses are for motions in different and non-parallel planes within one degree in azimuth either side of the relative velocity vector minimum. Furthermore, antennas adapted to provide exactly the theoretical coverage discussed in my said prior patent are not readily available, and practical commercially available antennas are capable of providing visibility in this "zone of silence" at a range shorter than the design range, but, still sufficient, under more severe maneuver conditions, to avoid a collision.

Having so fixed the theoretical coverage required by the systems of the present invention, let us now consider the characteristics of the antennas which should be selected to provide that coverage.

In the case of a "cooperative" system, mentioned previously, two antennas should be provided, i.e., a beacon antenna which provides illumination, and an antenna for the intercept receiver. It is clear that, since a collision can occur by a fast vehicle overtaking a slower one, the beacon antenna should have uniform coverage over 360 degrees of azimuth. This coverage can be obtained either by a single antenna or by a multiplicity of them suitably distributed. The desired elevation characteristics can be provided by fanning the beam about 10 degrees either above or below the horizontal plane. The fanning of the beacon antenna in the vertical plane, either above or below the horizontal plane, fixes the fanning of the intercept antenna with reference to the same plane. The fanning of the latter must be opposite to that of the former, i.e., below if the beacon antenna is fanned above, and vice versa. The azimuth beam width of the intercept antenna must be sufficiently narrow to achieve adequate separation of neighboring aircrafts and gain. The azimuthal coverage of $\pi$ radians can be attained by scanning, or by the distribution of a multiplicity of antennae, or both.

In a "non-cooperative" system, also mentioned previously, a single transmitter-receiver antenna is employed. The azimuth beamwidth and azimuth coverage is again controlled by similar considerations as in the case of the intercept antenna, but, the elevation beam should preferably be fanned above the horizontal plane, rather than below, to avoid excessive ground clutter.

Figure 4:
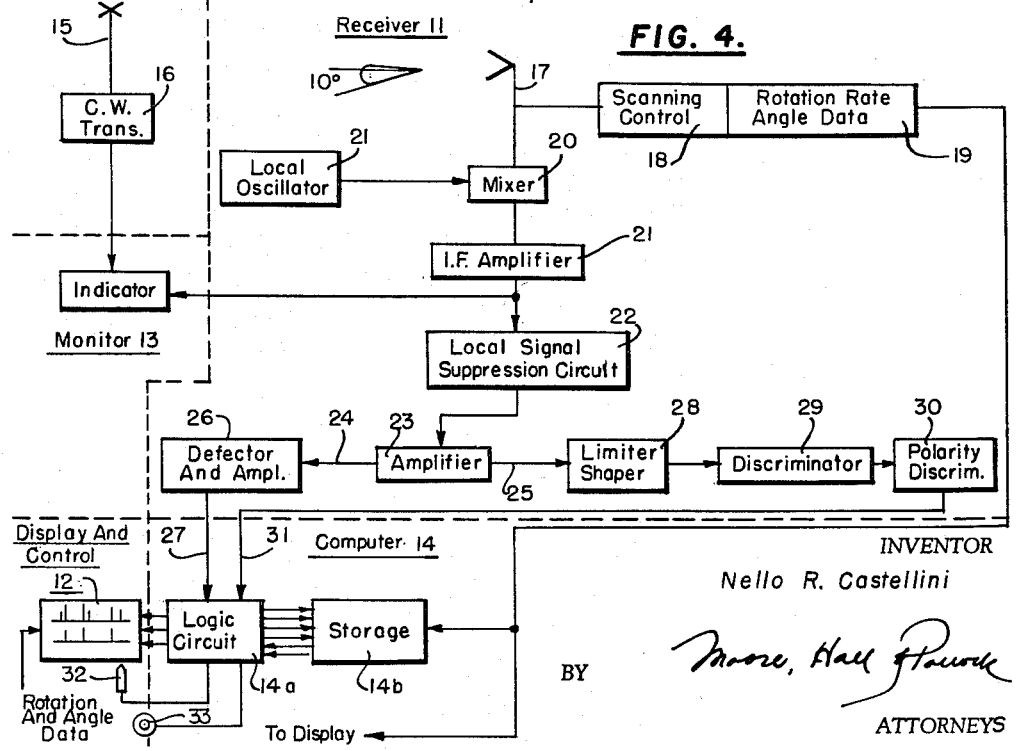
FIGURE 4 is a block diagram of a cooperative system constructed in accordance with the present invention.

FIGURE 4 shows a block diagram of a cooperative system, constructed in accordance with, and embodying the various considerations thus far discussed. As indicated in FIGURE 4, by the dashed line partitioning, such a cooperative system may comprise five major components; a beacon 10, a receiver 11, a display and control circuit 12, monitoring circuit 13, and a computer circuit 14. It will be understood that, by reason of the "cooperative" nature of the system, each vehicle will include all of the apparatus shown in FIGURE 4, i.e., each vehicle will include both a beacon and a receiver appropriately mounted thereon, for example, on a gyro-stabilized platform or mount.

The function of beacon 10 is to provide the vehicle with a means by which other vehicles can detect its presence. It consists of an antenna 15 and a CW transmitter 16. The antenna 15, for reasons already discussed, should have omnidirectional characteristics in azimuth, and a vertical coverage of about +10 degrees in elevation with reference to the flight plane. Techniques for attaining such characteristics are well known to the art. The transmitter 16 comprises a relatively low power (i.e., about 3 to 6 watts for a maximum range of 30 miles) CW oscillator. The only special features are the frequency calibration and stability of the oscillator, both of which should be in the order of 1 part in $10^9$.

Receiver 11 is a superheterodyne receiver which provides two outputs: one proportional to the strength of the received signal, and the other proportional to the speed of approach. Receiver 11 has some unconventional features which are described below.

Receiver antenna 17 scans 180 degrees in azimuth under the control of a scanning unit 18. Unit 18 also provides, at 19, scanning rate and angle data to the storage system of computer 14 (to be described), and to the display unit 12. The beamwidth of receiver antenna 17 is about +10 degrees in the vertical plane, and somewhat narrower (i.e., 2-4 degrees) in the horizontal plane. The output of antenna 17 is fed to a conventional mixer 20 which also receives the usual voltage from the local oscillator 21. This oscillator 21 is calibrated and stabilized to the same degree as the oscillator in transmitter 16. The output of mixer 20 is then fed to a conventional IF amplifier 21, the output of which is applied to a local signal suppression circuit 22.

The necessity as well as the purpose of circuit 22 will become evident when the input to the receiver is considered in some detail. Thus, the signal appearing at the terminals of antenna 17 consists not only of the desired signal from a distant beacon being monitored, but also includes some "spill over" from the local transmitter 16. By calculation, it can be shown that, assuming minimum and maximum operational ranges of one and twenty miles, respectively, the desired signal will be between $10^{-9}$ and $10^{-12}$ times the local signal in power. Antenna separation and cancellation by adjustable leakage path can be expected to reduce the disparity by a factor of about $10^6$ which still leaves the desired signal between $10^{-3}$ and $10^{-6}$ times the local signal. Under these conditions, the local signal would so predominate as to render impossible the measurement of signal strength and doppler frequency sense upon which the operation of the system is based. Therefore, to operate the system as intended, it is necessary to reduce the amplitude of the local signal relative to that of the desired signal, so that at all times the local wave power will be sufficiently less than that of the latter to exert negligible influence on the desired measurements. Circuit 22 accomplishes this transformation.

Various circuits adapted to perform local signal suppression will be suggested to those skilled in the art. In a preferred embodiment of the present invention, the output of circuit 22 is a complex wave which consists of pulses, one pulse for each source intercepted, with an amplitude inversely proportional to the distance of the source and an envelope that is essentially the antenna pattern, superimposed on a continuous wave residue contributed by the local signal and noise. This output can be represented by $$E(t) = \Sigma_k P_k(R_k) \cos\left[(W_0 \pm D_k)t + \theta_k\right] + \text{residue} \quad (10)$$

where:

$\Sigma_k$ is an index identifying the particular source,
$P_k(R_k)$ is the corresponding envelope function,
$W_0$ is the carrier frequency,
$D_k$ is the doppler frequency, and
$\theta_k$ is an arbitrary epoch.

It is a fundamental property of the transformation performed by circuit 22 that, if $E_o$ and $E_{Ik}$ are the amplitudes of the local and distant signals at its input, the amplitude of the residue wave is of the order of $E_{Ik}/E_o$. Hence, it is evident that for normal operational ranges the residue is negligible. Various logical circuits can be constructed in accordance with Equation 10 by persons skilled in the art; and one possible circuit adapted to be used for circuit 22, in accordance with the logic of Equation 10 is described in my prior copending application Serial No. 172,443, filed February 12, 1962, for "Method and Apparatus for Reduction of Interference," now U.S. Patent No. 3,092,776, issued June 4, 1963.

The output of circuit 22 is fed to an amplifier 23 which provides a two channel output at 24, 25. One channel 24 feeds a detector and amplifier 26 which produces an output 27 proportional to the R.M.S. value of the signal and, therefore, inversely proportional to the distance of the source. The other channel 25 feeds a limiter-shaper 28 which yields an output consisting of pulses of uniform amplitude and duration. This output is fed to a discriminator 29 which produces an output proportional to the velocity $\vec{V}_r$ along the line-of-sight. The output of discriminator 29, when the input corresponds to $E(t)$ in Equation 10, supra, consists of a sequence of pulses of positive or negative polarity depending on the sign of the doppler frequency, D, and having an amplitude proportional to the magnitude of D.

The output of discriminator 29 is applied to a polarity discriminator or doppler sense circuit 30 which allows only positive pulses to appear at its output 31. Hence, all sources not approaching the vehicle are removed from further consideration by the system.

The output of detector 26 and of doppler sense circuit 30 are fed, suitably amplified, at 27 and 31, respectively, to the computer 14. The computer 14 determines which vehicles are within the collision or protected volume, and provides azimuth and distance information to the display 12 for as long as the vehicles remain within that volume. The operator by positioning a strobe 32 on a particular signal, and operating push-button switch 33, as will appear hereinafter, may erase that signal from the display.

Figure 4A:
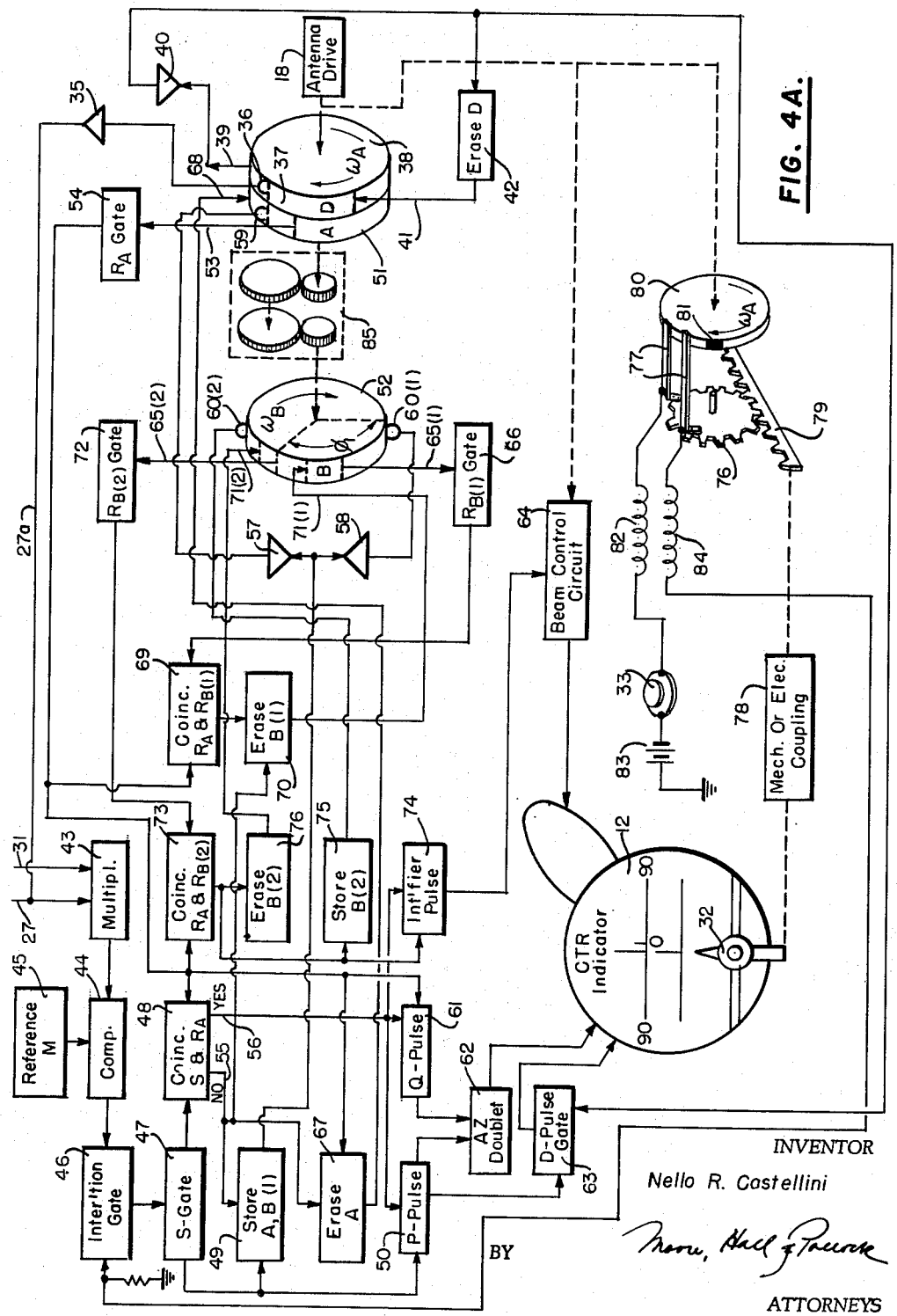
FIGURE 4A is a more detailed block diagram of a portion of the system shown in FIGURE 4.
Figures 5, 6:
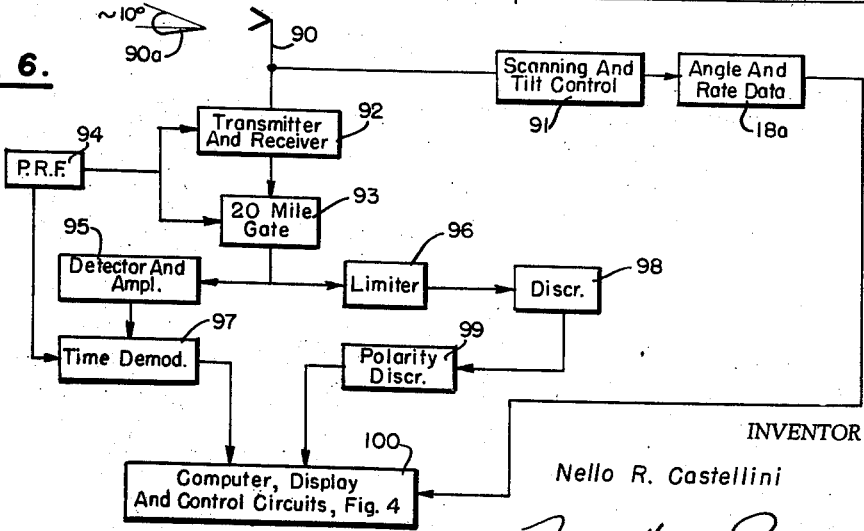
FIGURE 5 is a wave form plot illustrating the operation of the system shown in FIGURES 4 and 4A.
FIGURE 6 is a block diagram of a non-cooperative system constructed in accordance with the present invention.

A block diagram and other pertinent details of the display and control circuit 12, 32, 33, and of the computer 14, are shown in further detail in FIGURE 4A. The computer design shown there, and to be described in conjunction with the waveforms of FIGURE 5, provides for an observation interval of two antenna periods, $T_A$ (i.e., $\tau=2T_A$). This low value is chosen for purposes of the present description because, while it exhibits all peculiar elements of the design, it avoids complicating it unduly. A value of $\tau$ of five to ten times $T_A$ is more likely to be used in practice.

Briefly and simply stated, the purpose of the computer 14 is to examine the contents of channels 27 and 31 to determine which signals are from sources on a possible collision course and, for these signals, to provide azimuth and distance information to the pilot. The computer consists of two main components (see FIGURE 4), i.e., a logic circuit 14a and a storage circuit 14b.

The logic circuit 14a provides the input-output circuitry, as well as the circuitry by which the system selects those vehicles that have approach paths which subtend, at the protected vehicle, an angle equal to or less than $\zeta_k$; and logic circuit 14a does so by determining the rotation of the line-of-sight between vehicles. The range of $\zeta$ is $0\pm90°$, and the selection is made under conditions in which the relative radial speed varies between twice the maximum cruising speed of one vehicle and a speed which is as close to zero as practical.

As will become apparent from FIGURE 4A, the logic circuit consists of timing and coincidence gates, and pulse forming circuits of conventional design. Only the logic is peculiar to this application. Therefore, the circuit is defined in terms of this logic.

As already indicated, the input of the logic circuit 14a consists of the outputs 27 and 31 of the amplitude and doppler channels, respectively. The circuit's logic is based on Equaiton 7 under the requirement of constant observation time $t=\tau$. This restriction implies that Equation 8 be satisfied, that is, that the time at which observation is initiated be inversely proportional to the distance and directly proportional to the radial speed. Since the signal amplitude in the amplitude channel is in fact inversely proportional to the distance, while that in the doppler channel is proportional to the radial speed, the initiation of the observation interval is based on Equation 9 and the logic of the circuit is developed from it. Briefly, the logic is outlined below. It may be helpful, in conjunction with it, to refer to the waveforms of FIGURE 5 which picture the intercept and logical pulse sequence on two successive antenna periods for an observation interval $\tau=5$, i.e., at $t=0$, $t=T_A$ and $t=\tau=5T_A$. In FIGURE 5, eight signal pulses are shown. They represent three different types of signals: pulses 1, 4 and 7 represent a vehicle which remains within the protected volume for the observation interval $\tau$; pulses 3 and 6 represent vehicles which move out of this volume within one antenna period; and pulses 2, 5 and 8 represent a vehicle which, while remaining within the collision volume, is too distant and is moving towards the protected vehicle too slowly to be admitted for observation.

As indicated on lines 2 and 3, FIGURE 5, the signals in channels 27 and 31 are coincident in time. The logical operations, however, needed to decide whether or not the incoming signals are from sources within the protected volume consume a finite time. Therefore, in order to insure correspondence between azimuth and distance information, it is necessary to store the distance data until the time it is known whether or not it is needed. Accordingly, the contents of the amplitude channel 27 are applied through lead 27a and amplifier 35 to a magnetic recording head 36 disposed adjacent a track 37 (also labeled track D) of a magnetic drum storage unit 38. This unit 38 rotates at a speed related to the antenna design and is described in greater detail later. The time interval which elapses between the instant a signal is stored, and the instant it may be required, is about $\delta$ second, where $\delta$ is given in Equation 11 below. Hence, a reading head 39 is positioned on the track 37 to read out the information stored $\delta$ second earlier. The read-out information is supplied to amplifier 40 for distribution to a circuit, to be described later, which makes the decision whether or not to use the information. The information on track 37, see line 5 of FIGURE 5, after it has passed under reading head 39 and read, must be erased before the same point on the track comes again under writing head 36. To do this erasing head 41 is conveniently positioned ahead of writing head 36 and past head 39 to erase the contents of track 37 as it moves underneath. Erasing voltage for the purpose is furnished by circuit 42 which is conveniently actuated by and under the control of reading head 39.

As pointed out above, in order that the signals be admitted for observation, they must satisfy Equation 9. Hence, the first logic rule is: If the product of corresponding signal voltages in channels 27 and 31 equals or exceeds a reference threshold M, admit the signal to observation, otherwise reject it. To satisfy this condition therefore the signals in channels 27 and 31 are multiplied together in the multiplier 43 on a continuous basis and the output is compared in comparator circuit 44 aaginst a reference voltage M fixed by design and controlled by 45. For any resulting product signal which equals or exceeds the reference voltage, the comparator 44 gives a pulse output of the same amplitude and width; while, for those signals which do not exceed the reference voltage, no output is given; and they are therefore suppressed. This is the reason why although signal No. 2 is present on lines 2 and 3 of FIGURE 5, it is absent from line 4 of said FIGURE 5.

The output of comparator 44 is fed to an interruption gate 46 whose complete function will be described later; normally, however, gate 46 is designed to pass the output of 44 unhindered so that, essentially, the output of 44 is applied to circuit 47 which has the important function of generating a gate, called the S-gate. This gate is, so to speak, the basic element not only of the computer but of the system, inasmuch as its time width expresses the collision criterium defined in Equation 7. Since the reference rotation $\theta_k$ of the line-of-sight, by the assumed principle of operation, is a constant, the same for all distances and speeds, the time width of the S-gate, say $\delta$, is also constant and is related to $\theta_k$ by $$\delta = T_A \theta_k / 2\pi \qquad (11)$$

where:

$T_A$ is the period of the scanning antenna system and also that of the A and D storage tracks (to be described).

Equation 11 shows that if $T_A=2$ sec. and $\theta_k=.02$ radian (approximately 2 degrees), $\delta=.006$ second. The output of 47 consists of pulses of the same width $\delta$ and the same amplitude, one pulse for each incoming pulse from 44. This output is applied to the coincidence gate 48 and to similar gates 49 and 50, the function of which will be described below.

The purpose of the gate 48 is to compare the azimuth of any incoming signal with a previous azimuth of this signal in order to determine whether or not the reference rotation $\theta_k$ has occurred. The azimuth information to carry out the comparison is stored on tracks 51 and 52, also referred to as track A and track B, respectively, of the magnetic drum storage unit described fully later. For the moment, it suffices to say that track A is the reference track and track B is the "observation interval" timing track. The recording heads of the two tracks are displaced a convenient angle $\phi_1$, with the angular speed of the B-track being so chosen that the signal pulses recorded on the two tracks will come again in time coincidence in exactly $\tau$ seconds, which represent the duration of the observation interval. The information stored is in the nature of pulses which are derived from the trailing edges of S-gates on some previous antenna period. Since the S-gate 47 is derived from the comparator 44 pulse output, which is essentially in time phase with the input video pulses, the trailing edges of the stored pulses are delayed $\delta+\epsilon$ seconds with reference to the input video. This fact has a bearing in the design of the storage unit and is considered more fully in conjunction with it.

Track A (or 51) rotates in step with the antenna, and as it moves under output head 53, the information is read out to circuit 54 which generates a gate similar to the S-gate, called the $R_A$-gate. This gate is also applied to coincidence circuit 48. Circuit 48 provides two outputs which are complementary of each other; the NO output over lead 55, in the absence of coincidence between the S- and the $R_A$-gates, and the YES output over lead 56 if coincidence between these gates occurs.

The occurrence of one or the other of these outputs initiates in the circuits which follow a set of logical operations which will now be described with the aid of FIGURE 5. Henceforth, reference to this figure will be by the number of the line which contains the information. To avoid confusion, attention is directed to the peculiar azimuth scale on line 1. It arises because, in the overall system, the antenna scans only approximately 90° left to 90° right of the fore-aft line or about 180° forward of the vehicle. Under such conditions, if only one antenna were used, scanning with the period $T_A$, where $T_A$ is also the period of the A-track drum, no signal could appear in the sectors $n\pi/2$ to $3n\pi/2$. This represents a loss of surveillance efficiency; and to recover this loss, several schemes are possible which, in performance, are equivalent to an antenna system consisting of two antennae space phased 180° and rotating with the period $2T_A$. The azimuth scale shown is obtained by using such antenna systems.

Accordingly, suppose that the storage tracks are completely erased and that the circuit is turned on at $t=0-\epsilon^1$, where $\epsilon^1$ is a small interval of time of the order of an antenna look. At this instant, the antenna is looking slightly left of head-on and intercepts a signal which generates the first pulse in the amplitude and doppler channel shown in lines 1 and 2. Taking the trailing edge of the pulse as reference, a convention followed throughout unless otherwise specified, at the instant $t=0$, then, a pulse appears at the input of circuit 47 which generates the S-gate pulse, i.e., the first pulse on line 8. As the gate is generated it is applied to circuit 48; but, since by assumption no $R_A$-gate is present, by the end of the S-gate (i.e., at $t=\delta$) no coincidence has occurred and circuit 48 indicates this fact by failing, say, to energize leads 55 and 56.

It is important to observe that the lack of coincidence is due to the absence of the $R_A$-gate. The logical implication of this is that the signal is new, either because it has not been previously encountered, or because, if already encountered, the azimuth has changed more than the prescribed amount. Hence, these considerations result in a second logic rule, performed by the circuit of FIGURE 4A: In case of lack of coincidence between the S- and $R_A$-gates, due to absence of the $R_A$-gate, store the azimuth information pertaining to the input pulse on both tracks A and B.

To apply this second logic rule, the output of circuit 47 and the output on lead 55 from circuit 48 are applied to circuit 49 which is so designed that it provides a pulse output at the time of the trailing edge of the S-gate if lead 55, at the same time, has not been energized. In the present case, therefore, circuit 49 generates a pulse whose trailing edge occurs at $t=\delta+\epsilon$, where $\epsilon$ is the width of the pulse generated. The pulse so generated is the first pulse encountered on line 13 (of FIGURE 5). The output of 49 is applied through amplifiers 57 and 58 to input head 59 of track A, and to input head 60(1) of track B. The stored pulse is the first pulse encountered on lines 6 and 7. The lack of coincidence between the pulse on line 13 and the pulses shown on lines 6 and 7 (all of FIGURE 5) is due to a transformation in coordinates, i.e., time is shown on line 13 and angles on lines 6 and 7, and on the positioning of the recording heads to provide for the interval and to compensate for the delay $\delta+\epsilon$.

As the antenna rotates past an azimuth of 75°R (right), pulse number 3 is encountered (pulse number 2 is rejected by the comparator). The above operations are repeated, and a storage pulse, which in FIGURE 5 appears as the second pulse on line 13, is generated by circuit 49 and it is stored in a similar way, taking the position indicated by the second pulse on lines 6 and 7. To avoid confusion, observe that, for simplicity in presentation, in placing the pulses on the tracks of line 5, 6 and 7 the tracks are imagined as stationary; hence, the positions of the pulses do not represent the actual relative position on a moving track. The tracks are given the motion required in one step when needed.

At the 90° point along the azimuth line on line 1, the antenna drive has gone through ¼ of its period. However, for the antenna system, which consists of two antennae, and for the storage drum, this motion represents ½ of the period $T_A$ of the storage drum. Accordingly, as the 90° line is crossed, the antenna (or the other antenna, if two antennas are provided) starts scanning the left sector; and as it approaches head-on, specifically at 6°L (left), it intercepts a signal corresponding to pulse number 4 on lines 2 and 3. The circuit so far described operates on this pulse in the same manner as it did on pulses 1 and 3. Circuits 43 and 44 generate a pulse, i.e., the third pulse on line 4 of FIGURE 5, and circuit 47 generates the S-gate, the third pulse on line 8 which, as before, is applied to circuit 48. During the gate interval, more specifically $\delta/2$ seconds from the leading edge of the gate in this example, track A will have reached the end of the first rotation and the pulse recorded on the first intercept will have moved to the position occupied by the third pulse on line 6 (FIGURE 5). In this position, it is under the reading head 53 and therefore, circuit 54 will generate the $R_A$-gate which, on the time axis, has the position occupied by the first pulse on line 9. It is evident from the relative position of the S- and $R_A$-gates, lines 8 and 9, respectively, that they overlap from $t=T_A$ to $t=T_A+\delta/2$ as shown by the first pulse on line 12. This causes circuit 48 to energize both lead 56 with the pulse shown on line 15 and lead 55 with a pulse of opposite polarity, not shown.

The occurrence of coincidence between S- and $R_A$-gates implies that the rotation of the line-of-sight relative to the azimuth recorded is less than the reference rotation $\theta_k$. In such case, it is clearly desirable to retain the old reference, and to effect an appropriate display of information showing the present and the reference azimuths, as well as the distance of the target in question. Accordingly, a third logical rule is derived, namely: In case of complete or partial coincidence of the S- and $R_A$-gates, inhibit storage of the new azimuth reference, and cause the display of the information on the present and reference azimuths and on the distance.

The first part of this third rule is implemented by circuit 49 which, on receiving the negative pulse on lead 55, is blocked from generating a storage pulse. The second part of this third rule is carried out by circuits 50, 61, 62, 63, and CRT indicator 12, as follows: circuit 50 is a coincidence, pulse generator circuit which receives the S-gate, pulse 4 on line 8, and the pulse from the coincidence gate 48, first pulse on line 12, over lead 56. It is designed so that when pulses on both inputs are present, a narrow pulse of specified amplitude, called the P-pulse, which coincides with the trailing edge of the S-gate, is generated at its output, as is shown on line 17. Since the P-pulse is generated from the S-gate, its position on the azimuth scale is essentially identical to that of the present signal input.

Similarly, circuit 61 is identical in all respects to circuit 50, except that one of its inputs is the $R_A$-gate from 54, rather than the S-gate from 47. The output of 61, called the Q-pulse, and shown on line 19 of FIGURE 5, is generated by the trailing edge of the $R_A$-gate; and its amplitude is ½ that of the P-pulse. The Q-pulse in relation to the P-pulse shows the position of the reference azimuth; also, being of different amplitude than the P-pulse, it is easily distinguished from it.

The outputs of 50 and 61 are applied to circuit 62, which is simply a linear amplifier operating to combine the pulses without altering their amplitude and time relation, and produces an output at the proper impedance level for distribution to the display mechanism 12.

At the time the P-pulse occurs at the output of 50, the distance information which has been stored on track D approximately $\delta$ seconds earlier is under the reading head 39 and available at the output of amplifier 40. The output of this amplifier is applied to circuit 63 which is essentially a gate and linear amplifier, and which also receives the P-pulse from 50 as an input. In the presence of the P-pulse, the distance information appears at the output of circuit 63, as shown by the first pulse on line 18, at the proper impedance level for distribution to the display 12.

The display circuit 12 is a two-beam cathode ray tube indicator of conventional design; one beam is assigned to the azimuth input from 62 and the other to distance input from 63. The sweeps are synchronized in step with the rotation of the A-track by the control circuit 64. Therefore, distance along the sweep corresponds to angle the track, and hence to azimuth of the signal. Accordingly, the outputs of 62 and 63 appear along the assigned sweep at a position corresponding to the azimuth of the signals as indicated by the pulses shown on the indicator sweeps in FIGURE 4A.

After crossing the zero azimuth point, the antenna scans the right sector, encountering only signal pulse 5, which is rejected by the comparator 44, and finally reaches the 90° point where again a switch to the left hand sector occurs. In the meantime, however, the pulses from signal number 3 stored on tracks A and B come under the reading heads 53 and 65(1). Hence, 54 generates an $R_A$-gate, and circuit 66 which is a circuit similar to 54, generates a gate called the $R_{B(1)}$ gate. The $R_A$-gate is applied to circuit 48, but, there being no S-gate (there cannot be one because there is no signal to generate it), the indication of NO coincidence is obtained over lead 55. Since here the lack of coincidence is due to the absence of the S-gate, it implies that the signal, which originally caused the storage of the reference signal which generated the $R_A$-gate, either has disappeared (by moving into the region of azimuth 90°R—180°R not seen by the antenna, for instance, is possible but unlikely) or it has moved in azimuth more than the reference amount. In any case, however, the following rule, the fourth logical rule, must then be satisfied: In case coincidence between S- and $R_A$-gates does not occur because the S-gate is absent, cause the erasure from tracks A and B of the reference pulse which gave rise to the $R_A$-gate.

The implementation of the fourth rule, to erase the reference pulse from the A-track, is done through circuit 67. This circuit is essentially identical to circuit 49 which generates the pulse for storage. Like circuit 49, circuit 67 receives the NO signal over lead 55 from 48, but, instead of having the S-gate as an input, it has the $R_A$-gate from 54 whose generating pulse is to be erased from the track. Clearly, this is done because the position of the $R_A$-gate generating pulse is known with reference to it, and this knowledge permits the placement of the erasing head to perform the desired erasure without disturbing the rest of the contents of the track. The output of 67 then, in the presence of an $R_A$-gate input and a NO signal input from lead 55 generates the erasing pulse which, as shown on line 14, occurs at the trailing edge of the $R_A$-gate, and which is applied to erasing head 68 disposed adjacent track A.

The implementation of the fourth rule, to erase the B-track reference pulse, is carried out in the present example by circuits 69 and 70. Circuit 69 is a coincidence gate similar to 48. It receives, however, the $R_A$-gate from 54 and the $R_{B(1)}$ gate from 66 as inputs, see lines 9 and 10 of FIGURE 5. Circuit 69 produces the output shown on line 15 if coincidence exists. The output of 69 is fed to erasing gate 70 which also receives the NO information on lead 55 from gate 48. Circuit 70 is designed to produce the erasing pulse shown on line 16 in the presence of coincidence in 69 if lead 55 is not energized (i.e., NO coincidence at 48). The output of 70 is fed to erasing head 71(1) which is positioned to erase the B-reference pulse which gave rise to it.

Some remarks seem necessary to justify the reasons for establishing the coincidence between the $R_A$- and $R_{B(1)}$ gates and for the need of additional heads to effect erasure on the B-track. These remarks, also, will make clearer the generalization of the circuit 4A to larger values of $n$.

The implementation of the logic rule to erase the B-track in the general case is more involved than in the case of the A-track because, since the B-track moves at a different speed than the A-track, it is not immediately known where the B-reference pulse is relative to the A-reference pulse or, which is the same thing, relative to the $R_A$-gate; clearly, however, its position must be known before it can be erased.

The position depends on $\tau$, on $T_A$ and $T_B$, and on the number of $T_A$ periods elapsed since it was recorded. To know the position, it is necessary to know the number of $T_A$ periods elapsed since it was recorded. Although this number is also not known, it can be determined.

As will appear hereinafter, in connection with the description of the storage unit, the speed of the B-track is chosen such that a point on the B-track moves, with reference to a point on the A-track, an angle $\phi_1$ radians (where $\phi_1$ is given in Equation 16 to be described) during the observation interval $\tau$; and, therefore, it moves $\phi_1/n$ radians per period $T_A$ of the A-track. Consequently, if the space phase between the output head 53 of the A-track and the number 1 input head, head 60(1) of the B-track, is made equal to $\phi_1$, and if, with reference to this input head, output heads are placed on the B-track every $\phi_1/n$ radians, there will be $n$ such heads, the last one of which is in space phase with the output head of the A-track. With such an arrangement, if pulses are simultaneously recorded on the two tracks at any time, every $T_A$ period, starting with the first after recording, there will be one and only one of these B-reading heads which gives an output in time coincidence with the output from the A-reading head 53. In fact, at $t=T_A$ it will be the output from the first head (the one nearest the input head 60(1)), at $t=2T_A$ that from the second, and so forth until at $t=\tau=nT_A$ it will be that from the last, 65(2) in FIGURE 4A, which is instrumental in fixing the $\tau$ interval.

Clearly, these time coincidences determine the position of the B-reference pulse uniquely, and hence determine also where to place the erasing heads to effect the erasure. In circuit terms, this involves associating with each B-output head exactly the same types of circuits associated with head 65(1) in FIGURE 4A, namely, circuits 66, 69, 70, and erasing head 71(1). The position of the erasing heads relative to the respective reading heads is given subsequently in the description of the storage unit. It is clear, then, that if $\tau=nT_A$, there will be $n$ such combinations of circuits; and in particular, for $n=5$ there will be five combinations, one for each reading head whose position plane is indicated on line 7. This being the case, it is also clear that the circuit of FIGURE 4A can be taken as the representation of the general case.

Returning now to the description of the antenna scan, which was interrupted at the 90° point of the left sector containing signal pulse number 6, this signal is admitted to the circuit. However, since there is no $R_A$-gate related to it, logic rule number two (described previously) is applied and storage pulse 6 in line 13 is stored in the A- and B-tracks just as pulses 1 and 3 on the same line were stored earlier.

As the scan continues and other pulses are encountered, the same type of operations given above will be repeated by the circuit until a signal is found which has experienced a change of azimuth less than $\theta_k$ during the observation interval. Then, no matter what observation interval the circuit is designed for, the relation between incoming signal pulses and stored reference pulses on the A- and B-tracks will be essentially similar to that of pulse number 7 on lines 2, 3, 4, 5 of FIGURE 5, and the reference pulse 1 on tracks A and B of lines 6 and 7. The latter pulses, in the given position, are simultaneously under the reading heads 53 and 65(2). The A-reference pulse generates the $R_A$-gate in circuit 54, and the B-pulse generates a similar gate in circuit 72 called the $R_{B(n)}$ gate ($n=2$ in FIGURE 4A and $n=5$ in FIGURE 5). These gates appear as the last pulse on lines 9 and 11 of FIGURE 5. At about the same time, the incoming pulse is generating the S-gate in circuit 47, a pulse which is shown on line 8. The S- and $R_A$-gates are applied as they are generated to circuit 48 which gives an output, the last pulse on line 12, indicating that the S- and $R_A$-gates are partially coincident and hence that the line-of-sight has rotated less than $\theta_k$. Similarly, the $R_A$-gate is applied to circuit 73 which is a gate circuit similar to 48. Circuit 73 also received the $R_{B(2)}$ from 72 and in this case, gives the output shown in line 20 indicating coincidence. Coincidence between the $R_A$ and $R_{B(2)}$ (in general $R_{B(n)}$) gates implies the termination of the observation interval because the condition attains only if this happens.

Coincidence in circuits 48 and 73 is of critical importance because it indicates that two vehicles have remained on collision course for the duration of the observation interval. Hence, the situation is dangerous, and steps must be taken to emphasize this fact to the operator to insure that proper avoidance action is taken. From the circuit point of view these steps are contained in the fifth logical rule of the circuit: If for a given signal, there exists coincidence both between the S- and $R_A$-gates, and between the $R_A$- and $R_{B(n)}$-gates, perform the following operation: (1) Apply the third logical rule, i.e., derive P and Q and D pulses and display them; (2) intensify the display at the azimuth of these pulses; (3) store signal reference pulse on the B-track in such position to obtain the coincidence of $R_A$- and $R_{B(2)}$-gates in the following period and attain repetition of this coincidence on successive periods; (4) erase the B-reference pulse and every reference pulse introduced in subsequent repetitions; (5) cause the interruption of step (3) on any successive period through the intervention of the operator.

The implementation of the first part of this rule is already implied in the circuit described in conjunction with the third rule; i.e., the coincidence of the S- and R-gates automatically brings that part of the circuit into play.

The second requirement of the fifth logical rule is implemented by circuit 74 which receives as inputs the YES outputs of 48 and 73 and produces the output shown on line 22 when coincidence on both 48 and 73 occur. The output of 74 is applied to circuit 64 which controls the position and intensity of the electron beams in 12, thereby intensifying the sweep and signal at the proper azimuth.

The third requirement of the fifth logical rule is implemented by circuit 75. The circuit is similar to 49 but it has, as inputs, the YES output from 48 on lead 56, shown in line 12, and the output from 73, shown on line 20 of FIGURE 5. If related coincidence in both 48 and 73 is attained, the output shown on line 21 is produced. This output is supplied to recording head 60(2) which is so placed, relative to output head 65(2) that the coincidence of the $R_A$-gate and $R_{B(2)}$-gate in the next period is insured.

The fourth part of the fifth logical rule is implemented by circuit 76 which is an erasing circuit similar to 70 except that it receives only the YES input from 73 because erasure is to be effected every time a coincidence between $R_A$ and $R_{B(2)}$ occurs. The erasing voltage shown on line 24 is supplied to erasing head 71(2).

The fifth step of the fifth logical rule is implemented by the operator, who, by operating strobe 32 and switch 33, brings into operation the external erasing control circuit consisting of toothed wheel 76, cylinder 80, and gate 46, and their associated components now to be described.

In the system described, the performance of the evasive maneuver is left to the operator who by looking at the display can judge whether or not the maneuver is required. Of course, if desired, such action could be instrumented or automated by additional circuits.

Relative courses which, for the duration of the observation interval, show a rotation of the line-of-sight equal to or less than $\theta_k$ are either truly collision courses or nearly so and hence very dangerous. For this reason, the logic circuitry is designed to provide for the display at maximum intensity of the azimuth and distance information on every antenna scan following the observation period, even though in these scans the rotation may attain values larger than $\theta_k$ (provided, of course, that the rotation does not suddenly become very large as it would if the evasive maneuver is initiated). The operator, by looking at the display, can judge by the separation of the doublet pulses whether a maneuver is required or whether to initiate a new period of observation. If he decides on the latter, he positions the strobe 32 on the signal and presses the erase button 33.

Briefly, the principle of operation of the circuit is as follows. The positioning of the strobe on a given azimuth on the display 12 causes, through mechanical or electrical coupling means 78, the linear movement of toothed bar 79 which engages toothed wheel 76. This wheel 76 is free to rotate about its axis and the linear position of strobe 32 is thereby transformed into angular position information in such a way that the 90–0–90 scale of the display is changed into 180–0–180 angular rotation of the wheel 76. Wheel 76 is of insulating material and carries a pair of contacts 77, closely spaced and insulated from each other, which rest on the surface of a short circuit cylinder 80. Cylinder 80 is also constructed of insulating material but carries, embedded on its surface, a metallic strip 81 of angular width $(\delta+\epsilon)/W_A$. The cylinder 80 is controlled by antenna drive 18 to rotate at the angular speed $W_A$ of the A-track, and is properly phased with said A-track. Hence, periodically, cylinder 80 closes the contacts 77 for $(\delta+\epsilon)$ second each period. The phase at which closure of the contacts is effected depends on the angular position of wheel 76 which carries the contacts 77. If the positions of strobe 32, wheel 76, and cylinder 80 are properly collimated with the A-track, since the display is properly related to the latter, 32, 76, and 80 will be in proper relation to the display. When so adjusted, then, the azimuth at which the strobe 32 is set will also be the azimuth at which the contacts 77 are closed once each rotation of the A-track; and, since the azimuth of the display and that of A-track are directly related to that of the incoming signal, the contacts 77 are closed at the azimuth of the incoming signal each time the antenna scans through it.

One of the contacts 77 is connected by a flexible lead 82 to a fixed terminal and thence to one terminal of a normally open switch 33, the other terminal of which is connected to the negative terminal of battery 83, the positive terminal of which is grounded. The other contact 77 is similarly connected by a flexible lead 84 to a fixed terminal and thence to one grid of interruption gate 46. The gate is so adjusted that the application of voltage 83 thereto biases it beyond cut off.

It is clear now that such cut off will occur once per period at any azimuth at which strobe 32 is set, if switch 33 is closed. Therefore, since the interruption of the signal pulse causes the absence of the S-gate for that signal, and hence no coincidence in 48 and 73, which in turn, brings about the erasure of the A- and B-reference pulses from the A- and B-tracks, it is seen that setting strobe 32 on a signal at any azimuth and pressing the switch 33 causes the disappearance of the particular signal from the display.

The storage unit consists of three tracks, that is, track 37 or the D-track, and tracks 51 and 52 also called the A- and B-tracks, respectively. Track A is the signal azimuth reference track, and the B-track is the observation interval timing track, and the D-track is the distance information storing track. The A- and D-tracks rotate in step with the antenna with a speed that depends on the design of the latter (it is twice the speed of the antenna system in the example discussed), and the B-track rotates either a little faster or a little slower than the A-track depending on design. To achieve this, the A- and D-track drum 38 is coupled by mechanical or electrical means directly to the antenna drive 18 as shown in FIGURE 4A, while the drum of the track B is coupled to the latter, as the driving source, through a gear arrangement. To obtain the desired speed, there are several arrangements which can be used. A possible one is shown schematically in FIGURE 4A by gear box 85, where, since the driver gear is larger than the driven gear, the angular speed $W_B$ of the B-track is larger than the speed $W_A$ of the A-track. The speed $W_B$ required depends on $W_A$, on the observation interval $\tau$ desired and on the phase difference $\phi_1$, indicated in FIGURE 4A, between certain reading and storing heads of track B which will be identified shortly. The expression relating these parameters is $$W_B = W_A \pm \phi_1/\tau \quad (12)$$

where the plus (+) sign is for the case where $W_B > W_A$, and the minus (−) sign applies when the opposite is true. If $n$ is the number of antenna periods $T_A$ contained in $\tau$, $\tau = nT_A$, then since $W_A = 2\pi/T_A$, Equation 12 can also be written $$W_B = (2\pi \pm \phi_1/n)/T_A = W_A(1 \pm \phi_1/2n\pi) \quad (12a)$$

The significance of Equations 12 and 12a will become clearer subsequently.

Associated with every track there is a number of magnetic heads which have already been encountered. Those associated with the D-track are: input head 36 for storing the information on the track, output head 39 for reading information from the track and head 41 for erasing information on the track. The corresponding heads associated with track A are 59, 53, and 68. The number of heads associated with each of the tracks A and D is three, and this number is independent of other system parameters. The number of heads of the B-track, on the other hand, is more involved, and depends on the observation interval $\tau$ chosen in the design, more specifically, on the number of antenna periods $n$ contained in $\tau$. For any given $n$, the number of heads is $2n+2$. Of this number, two are input heads and the rest divide equally between output and erasing heads. In the case of the circuit in FIGURE 4A, since it is drawn for $n=2$, there are six heads as follows: input heads 60(1) and 60(2), output heads 65(1) and 65(2), and erasing heads 71(1) and 71(2). Had the circuit been drawn for $n=5$, an examination of line 7 of FIGURE 5 shows that there would be 12 heads. The various heads are related as follows: (a) input head 60(1), output head 65(2), and erasing head 71(2) have a function related to the determination of whether or not the rotation of the line-of-sight during the $\tau$ interval is equal to or less than the reference rotation $\theta_k$; (b) output head 65(1) and erasing head 71(1) have a function related to the erasure of information placed on the track B by 60(1) should the rotation of the line-of-sight in one half $\tau$ (more generally in $\tau/n$) exceed the reference rotation; (c) input head 60(2), output head 65(2) and erasing head 71(2) have a function related to the repetition (until interrupted) of the azimuth information for those sources which during the observation interval have shown a rotation of the line-of-sight equal to or less than the reference rotations. These functions have been described in the foregoing description of the circuit.

It is evident from FIGURE 4A as well as from lines 5, 6, and 7 of FIGURE 5 that the heads are positioned in certain phase relationships. In FIGURE 4A, the relative position is correct, but it is exaggerated; in FIGURE 5, on the other hand, the relative position is more nearly correct. It is also evident that a particular phase relationship exists between the heads of one track and the corresponding heads of another. The reason for these phase relationships and the expressions governing them will now be examined.

For any given design, the position of the heads is fixed by the speeds $W_A$ and $W_B$, by the observation interval $\tau$, and by the width $\delta$ of the S-gate. In the case of the erasing heads, furthermore, the position prescribed by consideration of the above factors may be modified by design, to avoid coplanar positioning which may raise practical problems.

The basic expression relating $W_A$ and $\delta$ to the position of the input and output heads of the A- and D-track is made evident by observing that the input to the D-track leads the input to the A-track by $\delta$ seconds. Since the contents of the amplitude channel 27 are stored directly (i.e., with negligible delay) on the D-track, taking the trailing edge as the reference edge, the pulse will be stored on track D by head 36 at $t=0$ seconds. Now, if a pulse corresponding to this particular pulse is stored on track A through head 59, it is derived from the trailing edge of the S-gate which also, as we have seen, is derived from the trailing edge of the input pulse under consideration. Then, if the width of the derived pulse for storage in A is $\epsilon$ seconds, it is clear that storage will have occurred at $$t = \delta + \epsilon \quad (13)$$

This result shows that the input on head 36 of the D-track leads that on head 59 of the A-track by $\delta$ seconds. If the pulse width $\epsilon$ is small compared to $\delta$, it can be neglected.

To define the position of the output heads 39 and 53 on tracks D and A, respectively, with reference to the input heads, it is simply necessary to express the $t$ in Equation 13 in angular measure and note whether the resulting angle is one of lead or lag. Since the two tracks move with the speed $W_A$, the angle $\theta_1$ equivalent to $t$ in in (13) is $$\theta_1 = W_A(\delta + \epsilon) = 2\pi(\delta + \epsilon)/T_A \quad (14)$$

Reasoning from these requirements, and noting that, in the recording space, integral multiples of $2\pi$ are indistinguishable, it can easily be shown that the phase angles of the output head with reference to the input, denoting them $\theta_{oA}$ for the A-track and $\theta_{oD}$ for the D-track, are respectively $$\theta_{oA} = -2\pi(\delta + \epsilon)/T_A \quad (15)$$
$$\theta_{oD} = +2\pi(\delta + \epsilon)/T_A \quad (15a)$$

The minus sign in Equation 15 indicates that the angle is a lead angle, while the plus sign in Equation 15a shows that the angle is one of lag. These results, therefore, require that the output head on track A be placed ahead of the input head and that the opposite be done on track D, as shown in FIGURE 4A for $\tau = 2T_A$, and in FIGURE 5, lines 5 and 6 for $\tau = 5T_A$.

The position of the heads on track B is influenced not only by the width of the S-gate, but also by the relative speed $(W_B - W_A)$ of the B-track relative to the A-track and by the observation interval $\tau$. Because $W_A$ and $W_B$ are different, the space phase between specified points on A and B varies with time. In particular, if a point on A is taken as a reference, a point on B appears to move with reference to it, moving ahead of it if $W_B > W_A$ and lagging behind if $W_A > W_B$. If $W_A$, $W_B$, and $\tau$ are given, this fact is used to determine the angle $\phi_1$ by which the input head leads or lags the last output head which is the one related to the $\tau$ interval. Since by definition, $\tau$ is the time required to obtain a coincident output from two pulses recorded at the same instant on A- and B-tracks $\tau$ seconds earlier, the phase angle $\phi_1$ of the output head with reference to the input is $$\phi_1 = (W_B - W_A)\tau = n(W_B - W_A)T_A \quad (16)$$

which shows that $\phi_1$ is positive (lag) or negative (lead) depending on whether $W_B$ is greater or less than $W_A$. The case illustrated in FIGURES 4A and 5, is for $W_B > W_A$. In particular, in FIGURE 4A, output head 65(2), which is the one related to the determination of the reference rotation, is placed past (in the direction of rotation) the input head 60(1). Output head 65(1), which has the function related to the erasure of the input from 60(1) should the reference rotation be exceeded in $\tau/2$, is placed $\phi/2$ radians past 60(1). It should be observed, in this regard, that the result is so because $\tau = 2T_A$. If $\tau$ were equal to $nT_A$, there would be output heads every $\phi_1/n$ radians, as illustrated in line 7 FIGURE 5 for $n=5$.

The placing of the input head 60(2), which is related to the repetition of the azimuth information of those sources whose line-of-sight during the $\tau$ interval has undergone a rotation smaller than the reference rotation, is established by the condition that the input stored by it must provide an output on head 65(2) which is coincident with that on head 53 of track A. Taking this condition into consideration, the phase angle $\phi_2$ of head 60(2) with reference to 65(2) is found to be $$\phi_2 = W_B(\delta + 2\epsilon) \quad (17)$$

and, therefore, since the angle is positive, 60(2) is shown lagging beyond 65(2). The corresponding input head for the case $\tau = 5T_A$ is similarly shown in FIGURE 5, line 7.

The positioning of the erasing heads is guided by the rule that the information should be erased neither sooner than it has served its purpose, nor later than, if retained, it would cause ambiguities. The application of this rule, disregarding time, leads to placing the erasing heads as soon after readout as is convenient. Time of course enters as a factor because on track D, for instance, erasing is done each period, while on tracks A and B, the time of erasure is a variable integral number of periods. Time intervals in excess of one period, however, are taken care of by the circuit logic, with the result that the erasing heads are placed on the track as if erasure were to be done each period. Accordingly, since it is convenient to keep gating pulses approximately the same width, it turns out that, on track D, the erasing head 41 is placed $2\theta_1$ radians from head 39, where $\theta_1$ is given in Equation 14; and the same applies to erasing head 68 of track A. In case of the erasing heads of track B, if the heads are placed within the angular sector $\phi_1$, some of them cannot be spaced integral multiples of $\theta_B$ from the corresponding reading heads, where:

$$\theta_B = 2\pi(\delta + \epsilon)/T_B \quad (18)$$

without conflicting with the reading heads. For this reason, and also to avoid long delays, a spacing of $\theta_B/2$ radians is chosen.

The cooperative system, thus described, estimates distances by judging the strength of the received signal. Although the accuracy required in such estimates is not large (i.e., possibly even 50 percent could be tolerated; it is this wide latitude that makes the system possible) it is obviously desirable to keep the power of transmitter 16 in beacon 10, and receiver 11 sensitivity at the rated values. The monitor circuit 13 provides this function. In essence, circuit 13 may comprise a simple metering device on the transmitter 16 capable of giving an indication proportional to the output power, and a similar simple device coupled to the receiver 11 to give a rough indication of the strength of the received field which, in this case, is primarily proportional to RF power spillover from the transmitter. Its use aids in keeping the equipment operating normally.

A non-cooperative system, that is, a system employing radar transmission, based on the same mathematical principles as the cooperative system just described, is shown in FIGURE 6.

The antenna 90 has the elevation characteristic shown in the inset 90a in FIGURE 6 (similar such insets having been used in FIGURE 4 for the antennas thereof); and the azimuth and scanning characteristics are similar to those of the receiving antenna 17 of the beacon system already described in reference to FIGURE 4. The antenna 90 is similarly stabilized, but, in this case, it can also be tilted positively an amount which, through the scanning and tilt control unit 91, is a function of the height of the aircraft and of the depression of its heading, being just sufficient to keep ground clutter out of the 20-mile gate 93 during the craft descent.

The radar transmitter and receiver 92 is in itself well known, and consists of the components necessary to obtain an IF output capable of providing the equivalent of good MTI performance. The design of the PRF unit 94 is also consistent with this requirement. The selection of the pulse repetition frequency depends on the maximum range and on the desirability of eliminating ground clutter which might enter the receiver beyond maximum range. The PRF is chosen at about two-thirds of that permissible on the grounds of maximum range alone. This selection permits the elimination of clutter by blanking the receiver for the last one-third of the PRF period. This function is performed by 20-mile gate 93 which, although shown as operating on the IF output of receiver 92, might be more desirably placed before this output. Other well known methods of reducing clutter may, of course, be used.

The output of gate 93 is fed to both a detector and video amplifier 95 and to limiter 96. The output of the video amplifier 95 is applied to the time demodulator 97. This unit is of conventional design, and electronically provides an output voltage that is representative of the distance to the intruding aircraft.

The output of the limiter 96 is fed to a discriminator 98. This unit is designed in accordance with the design of the discriminator 29 in the beacon system of FIGURE 4. Accordingly, its output is proportional to the doppler frequency and, as in the case of the beacon system, only outputs due to velocity approach are passed by the doppler polarity discriminator 99.

The outputs of the time demodulator 97, of the doppler polarity discriminator 99, and of an appropriate angle and rate data source 18a (corresponding to 18 of FIGURES 4 and 4A) are processed and displayed by circuits 100 which are identical in design and operation to those of FIGURES 4 and 4A of the beacon system.

While I have thus described preferred embodiments of the present invention particularly adapted for use on airborne vehicles, it must be understood that the method of the present invention can be embodied in systems other than those specifically illustrated; adapted for vessels on the sea, as well as for ground vehicles, and it must be further understood that the various systems described can be changed in manners readily apparent to those skilled in the art. The foregoing discussion is, therefore, meant to be illustrative only and should not be considered limitative of my invention; and all such variations and modifications as are in accord with the principles described are meant to fall within the scope of the appended claims.

Having thus described my invention, I claim:

1. A collision apparatus for indicating the presence of a collision course between two vehicles moving relative to one another, comprising receiver means on at least one of said vehicles for receiving a signal indicative of the instantaneous position of the other of said vehicles relative to said one vehicle, means responsive to said received signal for deriving first and second control signals representative respectively of the relative distances between and rate of closure of said two vehicles, means responsive to said first and second control signals for producing a third signal related to the product of said first and second control signals, means for producing a reference signal comparison means for comparing the magnitude of said third signal with the magnitude of said reference signal to derive an output signal if said third signal exceeds said reference signal in magnitude, a visual indicator for selectively displaying said output signal, means for detecting apparent angular rotation of a line-of-sight between said vehicles as said motion progresses, and control means coupled to said visual indicator for controlling the intensity of said display, said control means including means operative to selectively intensify said display when the apparent angular rotation of said line-of-sight falls between predetermined limits.

2. The apparatus of claim 1 wherein said visual indicator includes erasable display means for displaying said output signal, said control means including further means to selectively erase said display when said apparent angular rotation falls within second different predetermined limits.

3. The apparatus of claim 1 wherein said visual indicator includes erasable display means for displaying said output signal, and manually operable means for selectively erasing said display.

4. The apparatus of claim 1 including receiving antenna means coupled to said receiver means for receiving said signal, said receiving antenna means having a reception coverage of substantially 180° forward of said one vehicle, and having a vertical coverage displaced substantially 10° to horizontal.

5. The apparatus of claim 4 wherein said collision apparatus includes transmitting beacon means on said one vehicle.

6. The apparatus of claim 5 wherein said transmitting beacon means includes transmitting antenna means having substantially 360° uniform coverage in azimuth and having a vertical coverage of substantially 10° to horizontal, the vertical coverages of said receiving and transmitting antennas being displaced in opposite directions to horizontal respectively.

7. An apparatus for determining whether two vehicles moving relative to one another are approaching one another in such manner as to tend to fall within a minimum distance desired between said vehicles, comprising antenna means on one of said vehicles for effecting a periodic surveillance of a substantially fixed volume adjacent said vehicle during successive substantially constant time intervals, receiver means coacting with said antenna means and responsive to signals received by said antenna means during said surveillances indicative of the instantaneous position of the other of said vehicles relative to said one vehicle for detecting the rate of apparent angular rotation of a line-of-sight between said vehicles as said relative motion progresses, said receiver means including means responsive to doppler components in the same said received signal for detecting the sense of said doppler components, indicator means for displaying said position indicative signals in response to a detected doppler sense indicative of closure between said vehicles, and means for intensifying the display on said indicator means when the rate of said line-of-sight rotation falls below a predetermined value.

8. A collision apparatus for indicating the presence of a collision course between two vehicles moving relative to one another comprising receiver antenna means on one of said vehicles for receiving successive signals indicative of successive positions of the other of said vehicles relative to said one vehicle, receiver means on said one of said vehicles coacting with said antenna means and responsive to said received signals for detecting apparent angular rotation of a line-of-sight between said vehicles, said receiver means including means for substantially simultaneously detecting the amplitude and sense of doppler components in said received signals, and output means coupled to said receiver means for producing a characteristic output indicative of the presence of such a collision course when said line-of-sight rotation and said doppler amplitude and sense components all fall within predetermined limits.

9. The apparatus of claim 8 including polarity sensitive means for producing a control signal when said doppler sense indicates relative approach between said vehicles, and means for inhibiting operation of said output means in the absence of said control signal.

10. The apparatus of claim 8 including means for producing a control signal related to the product of the amplitude of said received signals and the frequency of said doppler components in said received signals, and means for inhibiting operation of said output means when said control signal falls below a predetermined value.

11. In combination, a moving vehicle, and control means on said vehicle adapted to determine when said vehicle is on a collision course with an interfering object, said control means comprising first means for measuring the radial component of relative velocity between said vehicle and object, said first means being operative to produce a first control signal related to said radial component, second means for producing a second control signal related to the distance between said vehicle and object, third means coupled to said first and second means for producing a third control signal related to the product of said first and second control signals, means for measuring the tangential component of relative velocity between said vehicle and object and operative to produce a fourth control signal related to said tangential component, and means jointly responsive to said third and fourth control signals for selectively indicating the presence of a possible collision course between said vehicle and object.

12. The combination of claim 11 wherein said control means includes receiver means carried by said vehicle for receiving radiant energy from said interfering object, and directional antenna means carried by said vehicle and coupled to said receiver means for intercepting said radiant energy from said interfering object only when said object is located within a solid angle of substantially 180° in azimuth and substantially 10° in elevation forward of said moving vehicle.

13. In a system for determining whether first and second objects moving relative to one another are on collision courses, control apparatus comprising the combination of first means for successively measuring the tangential component of relative velocity between said objects as said relative motion progresses and operative to produce a first control signal, second means for successively measuring the radial component of relative velocity between said objects as said motion progresses, third means for successively measuring the distance between said objects as said motion progresses, fourth means responsive to said second and third means, when the sense of said measured radial component indicates relative approach between said objects, and operative to produce a second control signal jointly related to the measurements effected by said second and third means, and means for indicating the presence of a possible collision course when both of said first and second control signals fall within predetermined limits.

14. In a system for determining whether first and second objects moving relative to one another are on a collision course, the combination of means for making successive measurements of the line-of-sight between said objects during successive time intervals as said relative motion progresses, first comparison means coupled to said measurement means and responsive to said successive line-of-sight measurements for producing a first control signal related to the rate at which said line-of-sight exhibits rotation as said motion progresses, means for determining the distance between and closure rates of said objects along said line-of-sight during each measurement of said measurement means and operative to produce a second control signal jointly related to said distance and closure rate determinations, and control means responsive to both said first and second control signals for selectively indicating the presence of a possible collision course between said first and second objects.

15. In a system for determining whether first and second objects moving relative to one another are on a collision course, the combination of first means for selectively measuring the rate of rotation of a line-of-sight between said objects as said motion progresses, second means for measuring the distance between said objects, third means for measuring the rate of closure of said objects along said line-of-sight, means responsive to the measurements of said second and third means for generating a control signal having a magnitude jointly related to said distance and to said rate of closure, and control means responsive to the magnitude of said control signal for selectively rendering said first means operative thereby to initiate said rate of rotation measurement at a time jointly related to said distance and rate of closure, said control means including means generating a reference signal of preselected magnitude, and means for comparing the magnitude of said control signal with the magnitude of said reference signal.

16. In a system for determining whether first and second vehicles moving relatively to one another are on a collision course, monitoring means on at least one of said vehicles for receiving successive signals having doppler frequency components characteristic of the movement of said one vehicle relative to the other of said vehicles as said motion progresses, said monitoring means including doppler sense responsive means operative to produce an output signal only when said relative motion is one of relative approach, said monitoring means further including means responsive to occurrence of said output signal and to said doppler frequency components for producing a second control signal having a magnitude directly proportional to the relative speeds of said vehicles along a line-of-sight therebetween and inversely proportional to the distance between said vehicles along said line-of-sight, means for producing a reference signal, means for comparing the magnitudes of said reference and control signals for selectively producing a third control signal when a selected one of said signals exceeds the other in magnitude, means for deriving information related to the azimuth of the other of said vehicles, said monitoring means including means responsive to occurrence of said third control signal for storing said azimuth information, and means for comparing successively stored such azimuths effected from successive ones of said received signals thereby to determine the azimuth differences therebetween as said relative motion progresses.

17. The system of claim 16 including cathode-ray-tube display means for selectively displaying a successive pair of said stored azimuths as a pulse doublet, and means responsive to operation of said comparing means for selectively altering the intensity of said display.

References Cited by the Examiner

UNITED STATES PATENTS

| 2,969,539 | 1/61 | Miner. |
| 3,095,560 | 6/63 | Castellini. |
| 3,114,147 | 12/63 | Kuecken. |

CHESTER L. JUSTUS, *Primary Examiner.*

KATHLEEN CLAFFY, *Examiner.*